(12) United States Patent  (10) Patent No.: US 8,827,063 B2
Smith  (45) Date of Patent: Sep. 9, 2014

(54) SHARED CASH HANDLER

(71) Applicant: Cubic Corporation, San Diego, AZ (US)

(72) Inventor: Gavin R. Smith, Crawley (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 13/942,945

(22) Filed: Jul. 16, 2013

(65) Prior Publication Data

US 2014/0025200 A1  Jan. 23, 2014

Related U.S. Application Data

(60) Provisional application No. 61/672,701, filed on Jul. 17, 2012.

(51) Int. Cl.
*G07F 7/04* (2006.01)
*G06Q 20/00* (2012.01)
*G07D 11/00* (2006.01)
*G07F 11/00* (2006.01)

(52) U.S. Cl.
CPC .......... *G07F 11/002* (2013.01); *G07D 11/0048* (2013.01); *G07F 7/04* (2013.01); *G06Q 20/00* (2013.01)
USPC ......................................... 194/206; 700/241

(58) Field of Classification Search
CPC ......... G07F 7/04; G07F 11/002; G06Q 20/18; G06Q 20/20; G06Q 30/06
USPC ............... 194/206; 700/241, 244; 902/22, 24; 235/379

See application file for complete search history.

(56) References Cited

U.S. PATENT DOCUMENTS

| 4,578,009 A | 3/1986 | Granzow |
| 5,450,938 A * | 9/1995 | Rademacher ................. 194/206 |
| 2007/0246531 A1* | 10/2007 | Dabrowski .................... 235/381 |
| 2011/0195775 A1 | 8/2011 | Wells |

FOREIGN PATENT DOCUMENTS

EP  0 409 809 A1  1/1991

OTHER PUBLICATIONS

International Search Report and Written Opinion, PCT/US2013/050828, mailed Nov. 7, 2013, 189 pages.

* cited by examiner

*Primary Examiner* — Mark Beauchaine
(74) *Attorney, Agent, or Firm* — Kilpatrick Townsend & Stockton LLP

(57) ABSTRACT

A cash hander can be coupled with multiple vending machines or other devices to enable the vending machines to accept cash. Through various interactions, the cash handler can provide status updates to the vending machines and relinquish control a particular vending machine to accept cash for that vending machine. The cash handler can also maintain a queue to manage and/or prioritize requests from vending machines to accept cash.

20 Claims, 6 Drawing Sheets

SHARED CASH HANDLER

CROSS-REFERENCE TO RELATED APPLICATIONS

The present application is a non-provisional of U.S. Application No. 61/672,701, filed Jul. 17, 2012, entitled "SHARED CASH HANDLER," which is hereby incorporated by reference in its entirety for all purposes.

BACKGROUND

A cash handler is a piece of equipment that is able to accept cash, in the form of coins and/or notes, from a purchaser who would like to purchase a product or service. A cash handler automates the acceptance of cash so that a human attendant is not required. Often, cash handlers are integrated into vending machines to allow purchasers to use cash to purchase products from the vending machines. Due to the current ubiquity of payment cards (e.g., credit cards, debit cards, and the like), however, purchasers are less inclined to use cash at vending machines if vending machines permit payment with payment cards. This trend, together with the relatively high cost of cash handling, can significantly reduce the incentives for a vending provider to provide vending machines with cash handlers. Accordingly, vending providers may provide cash handling in a small subset of vending machines, if at all, which can make it difficult for potential product purchasers to find a vending machine capable of accepting cash.

BRIEF SUMMARY

Embodiments of the present invention are directed toward a shared cash hander, which can be a stand-alone device that can be coupled with multiple vending machines or other devices. This can increase the availability of the cash-accepting devices at marginal extra cost for the vending operator. Furthermore, separation of the cash handling capability from the main device can allow the bulk of the vending machine (in some applications) to be wall mounted, making room for wheelchair users to access the machine more comfortably.

An example method of sharing a cash handler between a plurality of transit vending machines, according to the disclosure, includes sending, with a communications interface of the cash handler, a first status of the cash handler to the plurality of transit vending machines. The first status is indicative of an availability of the cash handler to conduct a transaction. The method also includes receiving, with the communication interface, a request from a first transit vending machine of the plurality of transit vending machines for the cash handler to conduct a first transaction, sending, with the communication interface, information to the first transit vending machine to proceed with the first transaction, and sending, with the communication interface, a second status of the cash handler to at least a second transit vending machine of the plurality of transit vending machines. The second status is indicative of an unavailability of the cash handler to conduct a transaction. The method further includes receiving cash in the form of either or both coins or notes as part of the first transaction, sending with the communication interface, transaction information regarding the first transaction to the first transit vending machine, and storing information regarding the first transaction.

The example method of sharing a cash handler between a plurality of transit vending machines can include one or more of the following features and/or components. Receiving, after sending the second status, a request from the second transit vending machine for the cash handler to conduct a second transaction, and updating a queue to reflect the request from the second transit vending machine. Sending, with the communication interface, information indicative of the updated queue to the plurality of transit vending machines. Sending, after completing the first transaction, information to the second transit vending machine to proceed with the second transaction. The queue can include an identifier of the second transit vending machine, and a priority of the request from the second transit vending machine. Sending a third status to a remote computer. The third status can include information indicative of at least one of an amount of cash in the cash handler, a need to remove cash for the cash handler, a need to provide cash to the cash handler, or the cash handler is no longer operational.

An example cash handler, according to the disclosure, can include a communications interface, a cash-receiving module, a processing unit communicatively coupled with the communications interface and the cash-receiving module, and a memory communicatively coupled with the processing unit. The memory can include instructions that, when executed by the processing unit, cause the cash handler to send, with the communications interface, a first status of the cash handler to a plurality of vending machines, where the first status is indicative of an availability of the cash handler to conduct a transaction. The instructions can also cause the cash handler to receive, with the communication interface, a request from a first vending machine of the plurality of vending machines for the cash handler to conduct a first transaction, send, with the communication interface, information to the first vending machine to proceed with the first transaction, and send, with the communication interface, a second status of the cash handler to at least a second vending machine of the plurality of vending machines. The second status is indicative of an unavailability of the cash handler to conduct a transaction. The instructions can further cause the cash handler to receive, with the cash-receiving module, cash in the form of either or both coins or notes as part of the first transaction, send, with the communication interface, transaction information regarding the first transaction to the first vending machine, and store information regarding the first transaction.

The example cash handler can further include one or more of the following features. The memory can further include instructions for causing the cash handler to receive, after sending the second status, a request from the second vending machine for the cash handler to conduct a second transaction, and update a queue to reflect the request from the second vending machine. The memory can further include instructions for causing the cash handler to send, with the communication interface, information indicative of the updated queue to the plurality of vending machines, send, after completing the first transaction, information to the second vending machine to proceed with the second transaction, and/or update the queue with an identifier of the second vending machine, and a priority of the request from the second vending machine. The memory can further include instructions for causing the cash handler to send a third status to a remote computer. The third status can include information indicative of at least one of an amount of cash in the cash handler, a need to remove cash for the cash handler, a need to provide cash to the cash handler, or the cash handler is no longer operational.

An example system of cash handler sharing, according to the description, can include a first vending machine of a plurality of vending machines, a second vending machine of the plurality of vending machines, and a cash handler. The cash handler can be configured to send a first status of the cash handler to the first vending machine and the second vending machine, where the first status is indicative of an availability of the cash handler to conduct a transaction. The cash handler can be further configured to receive a request from the first vending machine to conduct a first transaction, send information to the first vending machine to proceed with the first transaction, and send a second status of the cash handler to at least the second vending machine, where the second status is indicative of an unavailability of the cash handler to conduct a transaction. The cash handler can also be configured to receive cash as part of the first transaction, send transaction information regarding the first transaction to the first vending machine, and store information regarding the first transaction.

The example system of cash handler sharing can include one or more of the following features. The cash handler can be further configured to update a queue to reflect a request from the second vending machine if the request from the second vending machine is received by the cash handler after sending the second status. The system can further include a remote monitoring computer configured to receive information regarding a status of the cash handler.

The cash handler can be further configured to send, to the remote monitoring computer, a third status, where the third status comprises information indicative of at least one of an amount of cash in the cash handler, a need to remove cash for the cash handler, a need to provide cash to the cash handler, or the cash handler is no longer operational. The cash handler can be further configured to send, after completing the first transaction, information to the second vending machine to proceed with a second transaction. The queue can include an identifier of the second vending machine, and a priority of the request from the second vending machine.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

For the purposes of explanation, the ensuing description provides specific details in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

A cash handler is a piece of equipment that is able to accept cash, in the form of coins and/or notes, from a purchaser who would like to purchase a product or service. A cash handler automates the acceptance of cash so that a human attendant is not required. Often, cash handlers are integrated into vending machines to allow purchasers to use cash to purchase products from the vending machines. Due to the current ubiquity of payment cards (e.g., credit cards, debit cards, and the like), however, purchasers are less inclined to use cash at vending machines if vending machines permit payment with payment cards. This trend, together with the relatively high cost of cash handlers, can significantly reduce the incentives for a vending provider to provide cash handlers.

Figure 1:
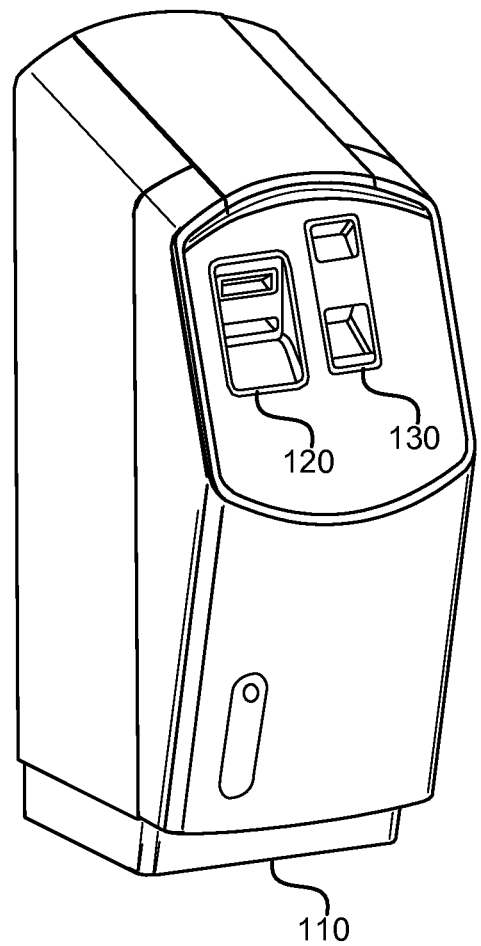
FIG. 1 is an illustration of a shared cash handler (SCH), according to one embodiment.

Embodiments of the present invention are directed toward a shared cash hander (SCH) that can be coupled with multiple vending machines. FIG. 1 illustrates an example SCH 110, according to one embodiment. The SCH 110 can comprise a stand-alone unit (i.e., not physically integrated into a vending machine) that can be communicatively coupled with a plurality of vending machines. The SCH 110 can comprise a sturdy body, capable of withstanding attacks from would-be thieves attempting to access the cash therein. The SCH 110 can also comprise a note module 120 and/or a coin module 130 capable of accepting notes and coins, respectively. The note module 120 and/or coin module 130 may also be capable of dispensing cash as well, enabling a purchaser to receive change for a purchase. In some embodiments, the functionality of the note module 120 and/or the coin module 130 may be combined in a single cash-receiving module.

Embodiments can vary substantially in form and functionality, depending on the desired application. Embodiments shown herein are directed toward providing cash handling for vending in transit systems, but the invention is not so limited. Other embodiments may include vending related to other forms of transportation, vending in stadiums and other venues, vending of food or other goods, and more. Furthermore, embodiments of an SCH 110 may also include other components, such as a user interface, light indicators, and more, and may also address how consumers may be provided privacy and/or denied access while the SCH 110 is being used. For example, embodiments of the SCH 110 may comprise a fixed cabinet positioned between two vending machines with retractable barriers either side of it, as a first purchaser using a first vending machine can select cash as their payment method, the barrier closest to them retracts while the other is extended, preventing a second purchaser at a second vending machine from accessing the SCH 110. Alternatively, the cash handler might be a unit that swivels to face the purchaser who wishes to use it, depriving the other purchasers from access to its user interface. A person of ordinary skill in the art will recognize many variations.

Figure 2:
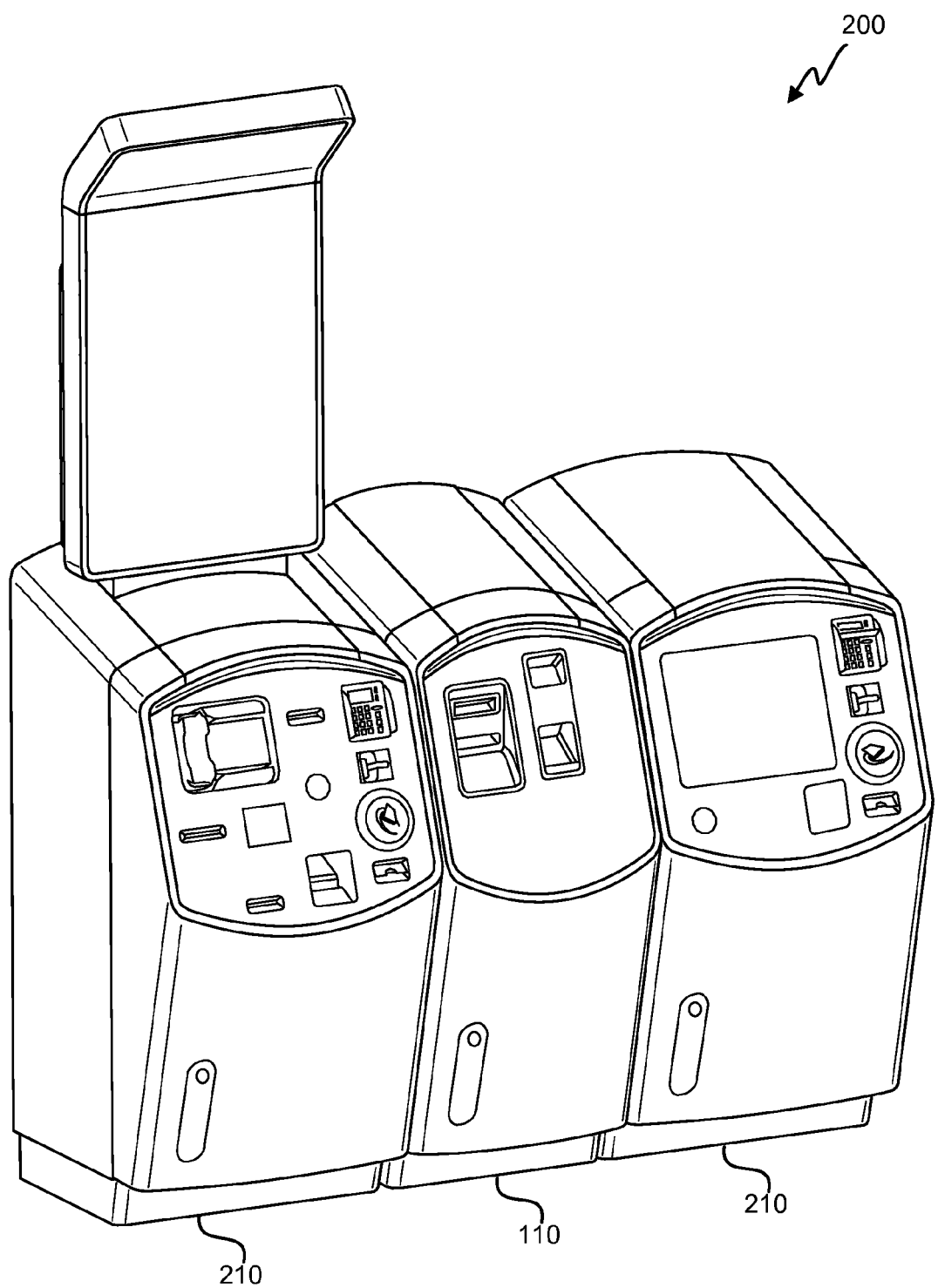
FIG. 2 is an illustration of an example configuration in which an SCH is shared between two vending machines.

FIG. 2 illustrates an example configuration 200 in which the SCH 110 is shared between two vending machines 210. As illustrated, the SCH 110 may be shared between different types of vending machines that may provide a purchaser different functionality. Example vending machines can include tablet ticket office, a ticket vending machine (TVM), and/or a video ticket office (VTO). Embodiments of VTOs are described in U.S. patent application Ser. No. 13/906,068, filed on May 30, 2013, entitled "Video Ticket Office," which is hereby incorporated by reference in its entirety for all purposes. Furthermore, embodiments may utilize devices other than vending machines, such as kiosks, portable devices, and/or other electronic devices, which may interact with the SCH 110 in a manner similar to the vending machines 210 described herein.

Vending machines may include a variety of features, which can vary depending on application and desired functionality. For example, vending machines may include one or more video displays, touchscreens, keypads, card readers, ticket dispensers, receipt printers, and the like. Furthermore, although the configuration 200 of FIG. 2 illustrates an SCH 110 in physical contact with the vending machines 210, other configurations may be set up differently. An SCH 110, for example, may be at an easily-accessible location physically separate from one or more vending machines 210.

Figure 3:
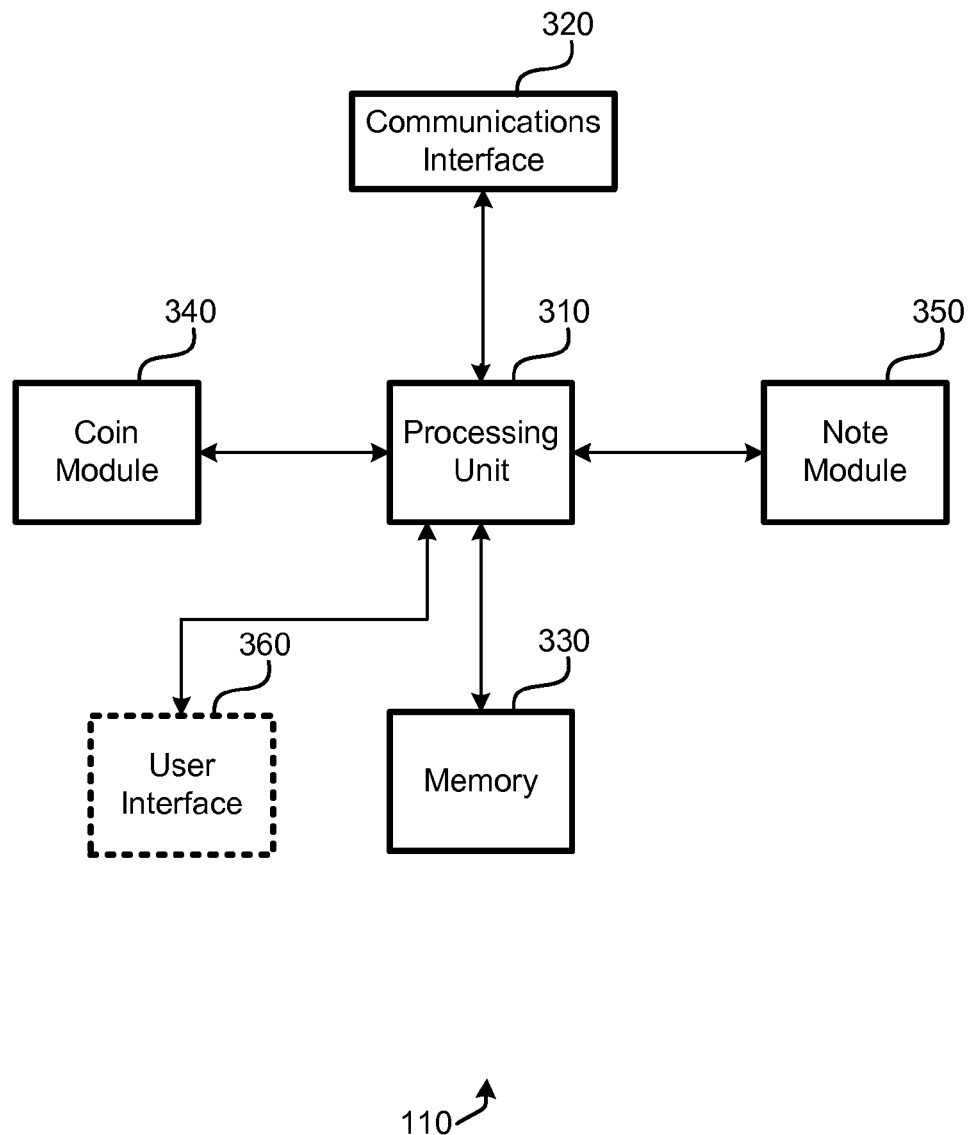
FIG. 3 is a simplified block diagram of physical components of an SCH, according to one embodiment.

FIG. 3 is a simplified block diagram of physical components of an SCH 110, according to one embodiment. The physical components can include a processing unit 310, memory 330, coin module 340, note module 350, and a communications interface 320. Optionally, the SCH 110 can include a user interface 360 and/or other components to provide output to and/or receive input from a purchaser. Other embodiments may include a larger or smaller number of components. Embodiments may combine, separate, and/or substitute components for those shown in FIG. 3. Furthermore, it should be noted that FIG. 3 is meant only to provide a generalized illustration of various components, any or all of which may be utilized as appropriate. Components may be implemented in a relatively separated or relatively more integrated manner. A person of ordinary skill in the art will recognize many variations.

Figure 5:
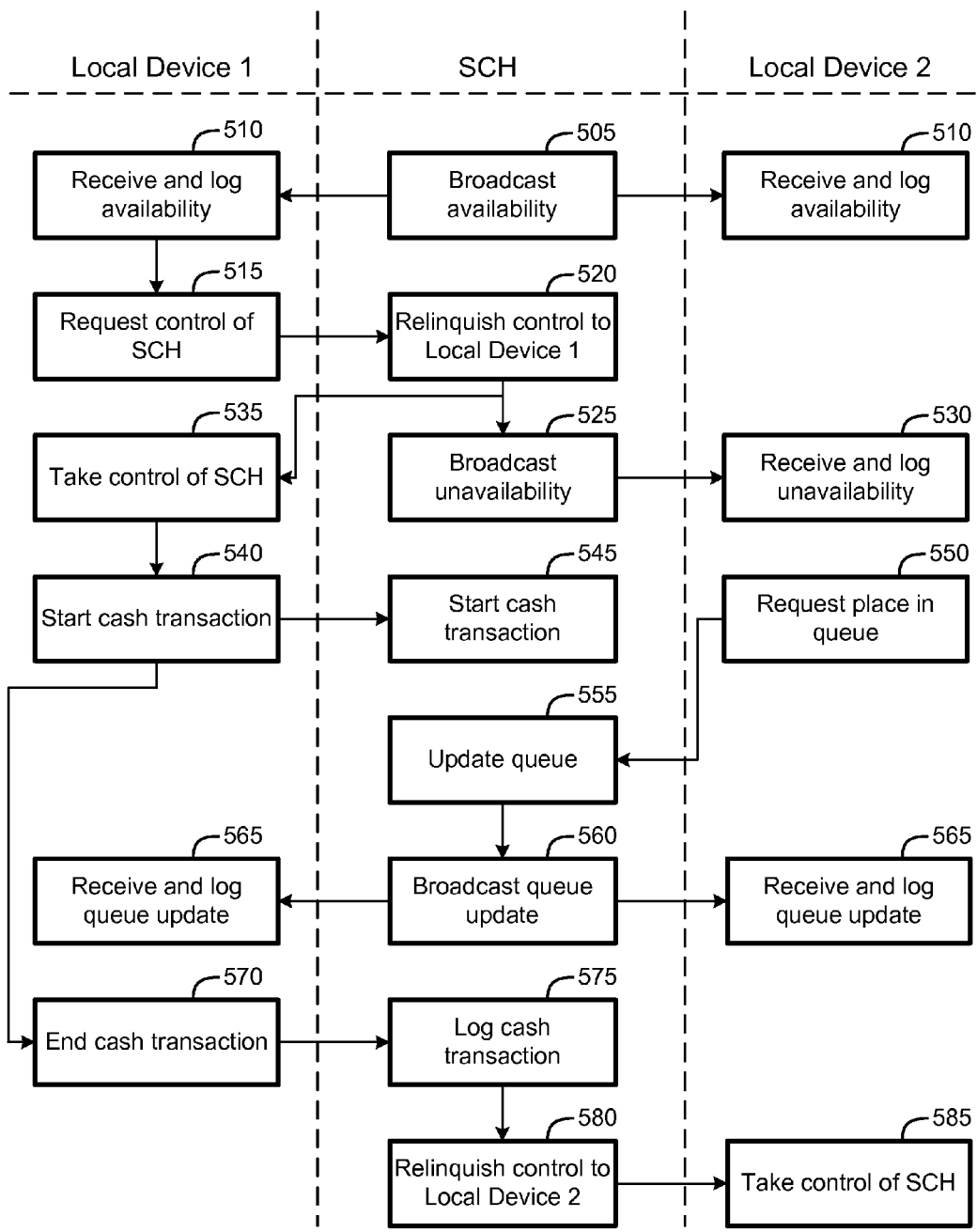
FIG. 5 is a swim-lane diagram illustrating example functionality of an SCH through the SCH's interaction with two local devices.
Figure 6:
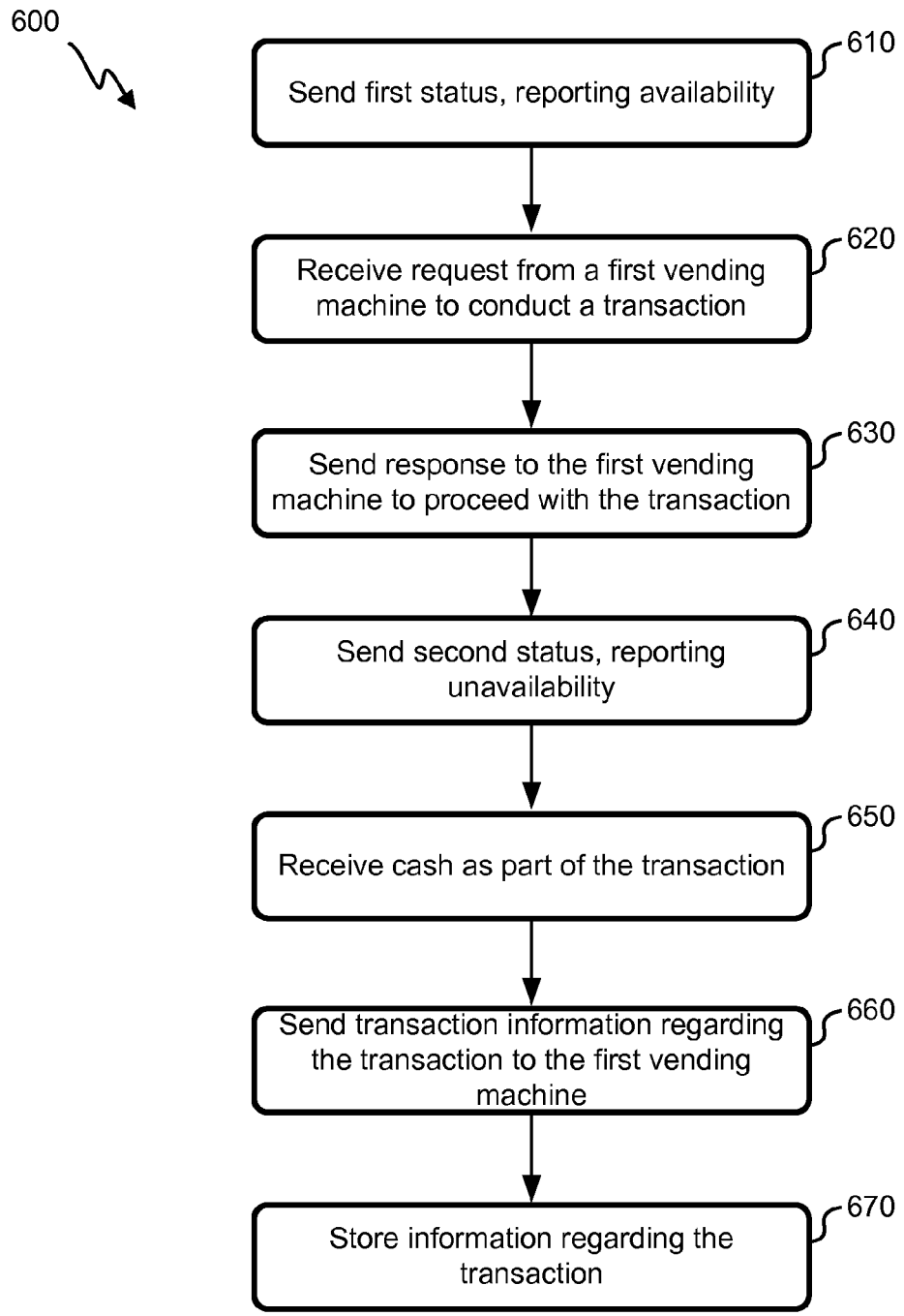
FIG. 6 is a flow diagram of a method of sharing a cash handler between a plurality vending machines according to one embodiment.

The hardware elements illustrated may be electrically coupled via a bus (not shown), or may otherwise be in communication, as appropriate. The hardware elements may include a processing unit 310 which can include without limitation one or more general-purpose processors, one or more special-purpose processors (such as digital signal processors (DSPs), graphics acceleration processors, application specific integrated circuits (ASICs), and/or the like), and/or other processing structure or means, which can be configured to execute functional components as illustrated below in relation to FIG. 4 and/or execute some or all components of a method, such as illustrated in FIGS. 5 and 6.

Optionally, the SCH 110 also can include a user interface 360, which can include without limitation one or more input devices, such as a camera(s), touch screen(s), a touch pad(s), microphone(s), button(s), dial(s), switch(es), and/or the like; and one or more output devices, which can include without limitation one or more display(s), light emitting diode(s) (LEDs), speaker(s), and/or the like. The user interface 360 can be used, for example, to confirm user input before completing a transaction. For example, if an SCH 110 is coupled with multiple vending machines and located at a central location that may be accessible to multiple potential purchasers, the vending machine might provide a purchaser with an identifier (e.g., a numerical code) associated with a transaction. The purchaser could then approach the SCH 110 and enter in the identifier using a keyboard, keypad, touchscreen, or similar device to initiate a transaction at the SCH 110. The SCH 110 may further include a display or other output device, prompting the purchaser to enter in the identifier. The optional user interface 360 may be used for other functions, such as displaying a cash amount required for a transaction, a cash amount inserted into the SCH 110, an error message if an error occurs, and the like.

The SCH 110 might also include a communication interface 320, which can include without limitation a modem, a network card, an infrared communication device, an antenna, a wireless communication device and/or a chipset (such as a Bluetooth™ device, an IEEE 802.11 device, an IEEE 802.15.4 device, a WiFi device, a WiMax device, cellular communication facilities, etc.), and/or other wireless or wired technologies. The communication interface 320 may permit data to be exchanged between the SCH 110, vending machines, remote computers, and/or any other electronic devices described herein. Furthermore, data may be exchanged between these devices via a local area network (LAN), wide area network (WAN) (including the Internet), ad-hoc network, and/or other private or public networks, depending on desired functionality.

The SCH 110 may further include and/or be in communication with a memory 330. The memory 330 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data structures, such as the FIFO and/or other memory utilized by the techniques described herein. For example, the memory 330 may be used to store a log of transactions made by the SCH 110, as discussed herein. Additionally or alternatively, memory 330 can be implemented by a cache or other local memory the processing unit 310.

The memory 330 of the SCH 110 also can comprise software elements (not shown), including an operating system, device drivers, executable libraries, and/or other code, such as one or more application programs, which may comprise computer programs provided by various embodiments, and/or may be designed to implement methods, provide functionality, and/or configure systems provided by other embodiments, as described herein. Merely by way of example, one or more procedures described with respect to the method(s) described herein, such as the methods described in relation to FIGS. 5 and 6 below, and/or the functions described in the components illustrated in FIG. 4 below, might be implemented as code and/or instructions executable by the SCH 110 (and/or processing unit 310 within the SCH 110) and/or stored on a non-transitory and/or machine-readable storage medium (e.g., a "computer-readable storage medium," a "machine-readable storage medium," etc.). In an aspect, then, such code and/or instructions can be used to configure and/or adapt a general purpose processor (or other device) to perform one or more operations in accordance with the described methods.

The coin module 340 and note module 350 can include hardware and/or software components configured to allow the SCH 110 to accept and store cash. Optionally, these modules 340, 350 may enable the SCH 110 to distribute cash as well (e.g., provide change to a purchaser). Cash can be counted and stored in the SCH 110, and transactions can be logged, to help ensure the proper amount of cash is inserted into the SCH 110 to complete a transaction, and that cash for all transactions is accounted for in the SCH 110.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 4:
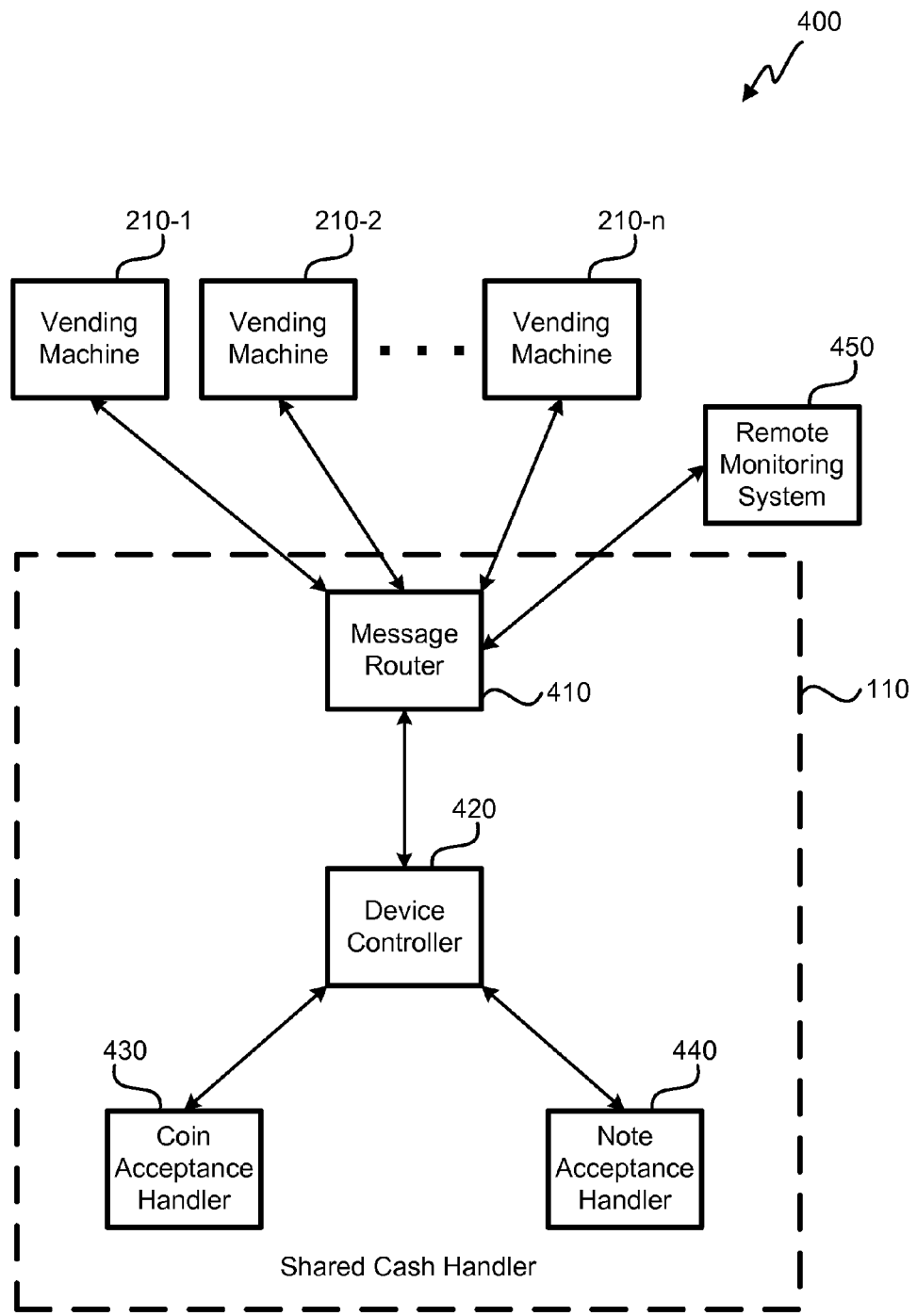
FIG. 4 is a simplified diagram of functional components of a vending configuration in which an SCH is utilized, according to one embodiment.

FIG. 4 is a simplified diagram of functional components of a vending configuration 400 in which an SCH 110 is utilized, according to one embodiment. These components can include an SCH 110, a remote monitoring system 450, and group of n vending machines 210. The SCH 110 can further include a message router 410, device controller 420, coin acceptance handler 430, and note acceptance handler 440. These functional components of the SCH 110 can be implemented in the software and/or hardware components of the SCH 110 illustrated in FIG. 3. As with other figures herein, the embodiment illustrated in FIG. 4 is an example. Other embodiments may combine, separate, and/or substitute components for those shown in FIG. 4. A person of ordinary skill in the art will recognize many variations.

The coin acceptance handler 430 and note acceptance handler 440 can include off-the-shelf hardware and/or software components configured to receive and/or distribute cash in the form of coins and notes, respectively. These handlers 430, 440 can share information with the device controller 420, such as an amount of cash collected and/or returned, status updates and the like.

The device controller 420 can be a component of the SCH 110 that coordinates and/or controls the functionality of the various other components of the SCH 110. The device controller can receive and manage requests from vending machines 210, received via the message router 410, which routes messages between the SCH 110, vending machines 210, remote monitoring system 450, and/or other devices (not shown). As described in more detail below, the status of the SCH 110 can be broadcast to the vending machines 210 and/or other devices, and incoming requests to the SCH 110 (e.g., to conduct a payment transaction) can be granted and/or queued, depending on the status of the SCH 110.

FIG. 5 is a swim-lane diagram illustrating example functionality of an SCH through the SCH's interaction with two local devices: Local Device 1 and Local Device 2. Local devices can include vending machines (such as vending machines 210 illustrated in FIGS. 2 and 4) and/or other devices (e.g., portable devices, consoles, kiosks, etc.) that may unitize the functionality of the SCH to collect and/or disperse cash. The interaction can begin when the SCH broadcasts its availability to conduct a transaction at block 505. The local devices each receive and log the availability status of the SCH at blocks 510. Broadcasting availability can include sending essentially any type of information indicative of the SCH's status that it is available to conduct a transaction.

At block 515, Local Device 1 requests control of the SCH, and the SCH relinquishes control to Local Device 1, at block 520, in response. Relinquishing control by the SCH to a local device can be accomplished in a variety of ways. The SCH can, for example, receive and execute commands from the controlling device to control cash handling. Alternatively, the SCH may provide a transparent connection between the controlling device and coin- and/or note-handling modules, allowing the controlling device to have direct control of cash handling. Other methods of relinquishing control of the SCH to a local device may also be used.

At block 525, the SCH broadcasts its unavailability to conduct a transaction to Local Device 2, which receives and log the unavailability status of the SCH at block 530. Such functionality can, for example, notify a vending machine that the SCH is currently unavailable, and the vending machine can relay this information to a purchaser, who may be told to wait momentarily until the SCH is available. Additionally or alternatively, the SCH may wait to broadcast unavailability until a request is made.

Before, after, or during block 525, Local Device 1 can assume control of the SCH, at block 535. Local Device 1 starts the cash transaction at 540, using SCH at block 545. The transaction can include collecting and/or distributing cash (e.g., collecting a payment and distributing change) for the purchase of a product or service. Depending on desired functionality, the SCH may relay varying levels of information to Local Device 1. For example, the SCH may indicate to Local Device 1 an updated amount of cash received with each coin or note inserted. Additionally or alternatively, the SCH may simply indicate a payment was successfully received.

In the interaction of shown in FIG. 5, Local Device 2 needs to conduct a transaction, and therefore sends a request to the SCH, at block 550, to be placed in the SCH's queue. The SCH's queue can be a list of tasks to complete in a certain order. Priority in the queue can be based on the time at which the request was made (e.g., first come, first served), and/or may be based on other factors, such as transaction type or amount. The queue can be stored in any of a variety of data structures (table, linked list, database, etc.), and may include various types of information, depending on implementation. Information for queue entries corresponding with transaction requests can include, for example, an identifier of a local device (e.g., an address), a transaction type and/or amount, a time related to the transaction request, and the like. At block 555, the SCH updates he queue accordingly. Additionally, the SCH may broadcast the updated queue at block 560 to the local devices, which receive and log the updated queue, at blocks 565. Such functionality can provide devices with information regarding their place in the queue, which may allow the local devices to provide approximate wait times (or the queue itself) to purchasers.

At block 570, Local Device 1 ends the transaction started at block 540. The transaction end upon certain triggering events, such as when a satisfactory payment has been received, when a transaction has timed out (e.g., when no or insufficient cash has been received by the SCH), and the like. The end of the transaction may be indicated by a message from Local Device 1 to the SCH, indicating that Local Device 1 is finished with the transaction. Additionally or alternatively, SCH may indicate to Local Device 1 that the transaction is complete. In either case, the SCH can log details about the transaction at block 575. The transaction log can be compared with an amount of cash in the SCH to help ensure that a proper amount of cash has been collected.

With the transaction completed, the SCH can then move to the next transaction in the queue. Accordingly, at block 580, the SCH then relinquishes control to Local Device 2, which takes control of the SCH at block 585. The process of broadcasting unavailability and conducting the transaction with Local Device 2 can proceed in a manner similar to the manner illustrated in FIG. 5 with regard to the transaction with Local Device 1.

FIG. 6 is a flow diagram of a method 600 of sharing a cash handler between a plurality vending machines, such as transit vending machines, according to one embodiment. Such functionality can be executed, for example, by an SCH 110 illustrated and discussed in FIGS. 1-5. Moreover, the method can enable interactions with local devices in a manner similar to the interaction shown in FIG. 5. It will be understood that embodiments can enable sharing of a cash handler between devices other than vending machines, and that components of the method 600 can be combined, separated, performed simultaneously or in an alternative order, and/or subject to other alterations.

At block 610, a first status is sent, reporting availability. As indicated above, this information can be used to inform vending machines that the queue is empty, and that a purchaser may not be subject to any wait time to use the cash handler.

At block 620, a request from a first vending machine to conduct a transaction is received. As indicated previously, the request can include any of a variety of information, such as an identifier of the first vending machine, details of the transaction, and the like. A response to the first vending machine to proceed with the transaction is sent at block 630.

At block 640 a second status is sent, reporting unavailability of the cash handler. The status can be sent to all vending machines communicatively coupled with the cash handler, or all vending machines except the first vending machine.

At block 650, the cash of the transaction is received. Change may also be dispersed to a purchaser, if change is available and/or coin and/or note modules are disposed to do so.

At block 660, transaction information regarding the transaction is sent to the first vending machine. As stated previously, this can vary, depending on desired functionality. For example, a cash handler may send messages to the first vending machine about the cash received (e.g., a running total, increments received, etc.). Additionally or alternatively, the cash handler may simply send an indication that the transaction was successful (or unsuccessful) to the first vending machine.

At block 670, the cash handler can store information regarding the transaction. The information may be stored on a transaction log local to the cash handler and/or sent to a remote computer (or other device) for storing.

The method 600 can include any of several variations. For example, the cash handler may receive, after sending the second status, a request from a second vending machine for the cash handler to conduct a second transaction, and update a queue to reflect the request from the second vending machine. Information of the updated queue can be sent to all or a subset of the vending machines communicatively coupled with the cash handler. A status can further be sent to a remote computer (e.g., the remote monitoring system 450 of FIG. 4) to allow the cash handler to be monitored remotely. The status can include information indicative of an amount of cash stored in the cash handler, a need to remove cash for the cash handler (e.g., an indication that the cash handler is at or near capacity to store some or all types of coins and/or notes), a need to provide cash to the cash handler (e.g., an indication that the cash handler has run out and/or is low on some or all types of coins and/or notes), and/or the cash handler is no longer operational (in which case the cash handler may further provide an error message to the remote computer).

In the foregoing description, for the purposes of illustration, methods were described in a particular order. It should be appreciated that in alternate embodiments, the methods may be performed in a different order than that described. It should also be appreciated that the methods described above may be performed by hardware components and/or may be embodied in sequences of machine-readable instructions, such as programming code, which may be used to cause a machine, such as a general-purpose or special-purpose processor or logic circuits programmed with the instructions to perform the methods. These machine-readable and/or computer-readable instructions may be stored on one or more non-transitory storage mediums, such as CD-ROMs or other type of optical disks, floppy diskettes, ROMs, RAMs, EPROMs, EEPROMs, magnetic or optical cards, flash memory, or other types of machine-readable storage mediums suitable for storing electronic instructions.

Embodiments provided herein are examples only, and is not intended to limit the scope, applicability, or configuration of the disclosure. Rather, the ensuing description of the embodiments will provide those skilled in the art with an enabling description for implementing one or more embodiments. It should be understood that various changes may be made in the function and arrangement of elements without departing from the spirit and scope of the disclosed systems and methods as set forth in the appended claims.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of," if used to associate a list, such as A, B, or C, can be interpreted to mean any combination of A, B, and/or C, such as A, AB, AA, AAB, AABBCCC, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

While illustrative and presently preferred embodiments of the disclosed systems, methods, and devices have been described in detail herein, it is to be understood that the inventive concepts may be otherwise variously embodied and employed, and that the appended claims are intended to be construed to include such variations, except as limited by the prior art.

What is claimed is:

1. A method of sharing a cash handler between a plurality of transit vending machines, the method comprising:
sending, with a communication interface of the cash handler, a first status of the cash handler to the plurality of transit vending machines, wherein the first status is indicative of an availability of the cash handler to conduct a transaction;
receiving, with the communication interface, a request from a first transit vending machine of the plurality of transit vending machines for the cash handler to conduct a first transaction;
sending, with the communication interface, information to the first transit vending machine to proceed with the first transaction;
sending, with the communication interface, a second status of the cash handler to at least a second transit vending machine of the plurality of transit vending machines, wherein the second status is indicative of an unavailability of the cash handler to conduct a transaction;
receiving cash in the form of either or both coins or notes as part of the first transaction;

sending with the communication interface, transaction information regarding the first transaction to the first transit vending machine; and storing information regarding the first transaction.

2. The method of sharing the cash handler between the plurality of transit vending machines as recited in claim 1, further comprising:

receiving, after sending the second status, a request from the second transit vending machine for the cash handler to conduct a second transaction; and updating a queue to reflect the request from the second transit vending machine.

3. The method of sharing the cash handler between the plurality of transit vending machines as recited in claim 2, further comprising sending, with the communication interface, information indicative of the updated queue to the plurality of transit vending machines.

4. The method of sharing the cash handler between the plurality of transit vending machines as recited in claim 2, further comprising sending, after completing the first transaction, information to the second transit vending machine to proceed with the second transaction.

5. The method of sharing the cash handler between the plurality of transit vending machines as recited in claim 2, wherein the queue comprises:

an identifier of the second transit vending machine, and a priority of the request from the second transit vending machine.

6. The method of sharing the cash handler between the plurality of transit vending machines as recited in claim 1, further comprising sending a third status to a remote computer.

7. The method of sharing the cash handler between the plurality of transit vending machines as recited in claim 6, wherein the third status comprises information indicative of at least one of:

an amount of cash in the cash handler, a need to remove cash for the cash handler, a need to provide cash to the cash handler, or the cash handler is no longer operational.

8. A cash handler comprising:

a communication interface;

a cash-receiving module;

a processing unit communicatively coupled with the communication interface and the cash-receiving module; and a memory communicatively coupled with the processing unit and comprising instructions that, when executed by the processing unit, cause the cash handler to:

send, with the communication interface, a first status of the cash handler to a plurality of vending machines, wherein the first status is indicative of an availability of the cash handler to conduct a transaction;

receive, with the communication interface, a request from a first vending machine of the plurality of vending machines for the cash handler to conduct a first transaction;

send, with the communication interface, information to the first vending machine to proceed with the first transaction;

send, with the communication interface, a second status of the cash handler to at least a second vending machine of the plurality of vending machines, wherein the second status is indicative of an unavailability of the cash handler to conduct a transaction;

receive, with the cash-receiving module, cash in the form of either or both coins or notes as part of the first transaction;

send, with the communication interface, transaction information regarding the first transaction to the first vending machine; and store information regarding the first transaction.

9. The cash handler as recited in claim 8, wherein the memory further includes instructions for causing the cash handler to:

receive, after sending the second status, a request from the second vending machine for the cash handler to conduct a second transaction; and update a queue to reflect the request from the second vending machine.

10. The cash handler as recited in claim 9, wherein the memory further includes instructions for causing the cash handler to send, with the communication interface, information indicative of the updated queue to the plurality of vending machines.

11. The cash handler as recited in claim 9, wherein the memory further includes instructions for causing the cash handler to send, after completing the first transaction, information to the second vending machine to proceed with the second transaction.

12. The cash handler as recited in claim 9, wherein the memory further includes instructions for causing the cash handler to update the queue with:

an identifier of the second vending machine, and a priority of the request from the second vending machine.

13. The cash handler as recited in claim 8, wherein the memory further includes instructions for causing the cash handler to send a third status to a remote computer.

14. The cash handler as recited in claim 13, wherein the third status comprises information indicative of at least one of:

an amount of cash in the cash handler, a need to remove cash for the cash handler, a need to provide cash to the cash handler, or the cash handler is no longer operational.

15. A system of cash handler sharing comprising:

a first vending machine of a plurality of vending machines;

a second vending machine of the plurality of vending machines; and a cash handler, wherein the cash handler is configured to:

send a first status of the cash handler to the first vending machine and the second vending machine, wherein the first status is indicative of an availability of the cash handler to conduct a transaction;

receive a request from the first vending machine to conduct a first transaction;

send information to the first vending machine to proceed with the first transaction;

send a second status of the cash handler to at least the second vending machine, wherein the second status is indicative of an unavailability of the cash handler to conduct a transaction;

receive cash as part of the first transaction;

send transaction information regarding the first transaction to the first vending machine; and store information regarding the first transaction.

16. The system of cash handler sharing as recited in claim 15, wherein the cash handler is further configured to update a queue to reflect a request from the second vending machine if the request from the second vending machine is received by the cash handler after sending the second status.

17. The system of cash handler sharing as recited in claim 16, further comprising a remote monitoring computer configured to receive information regarding a status of the cash handler.

18. The system of cash handler sharing as recited in claim 17, wherein the cash handler is further configured to send, to the remote monitoring computer, a third status, wherein the third status comprises information indicative of at least one of:
- an amount of cash in the cash handler,
- a need to remove cash for the cash handler,
- a need to provide cash to the cash handler, or
- the cash handler is no longer operational.

19. The system of cash handler sharing as recited in claim 16, wherein the cash handler is further configured to send, after completing the first transaction, information to the second vending machine to proceed with a second transaction.

20. The system of cash handler sharing as recited in claim 16, wherein the queue comprises:
- an identifier of the second vending machine, and
- a priority of the request from the second vending machine.

\* \* \* \* \*